March 27, 1934. T. T. GRAY 1,952,855
METHOD OF PURIFYING HYDROCARBON COMPOUNDS
Original Filed March 24, 1925
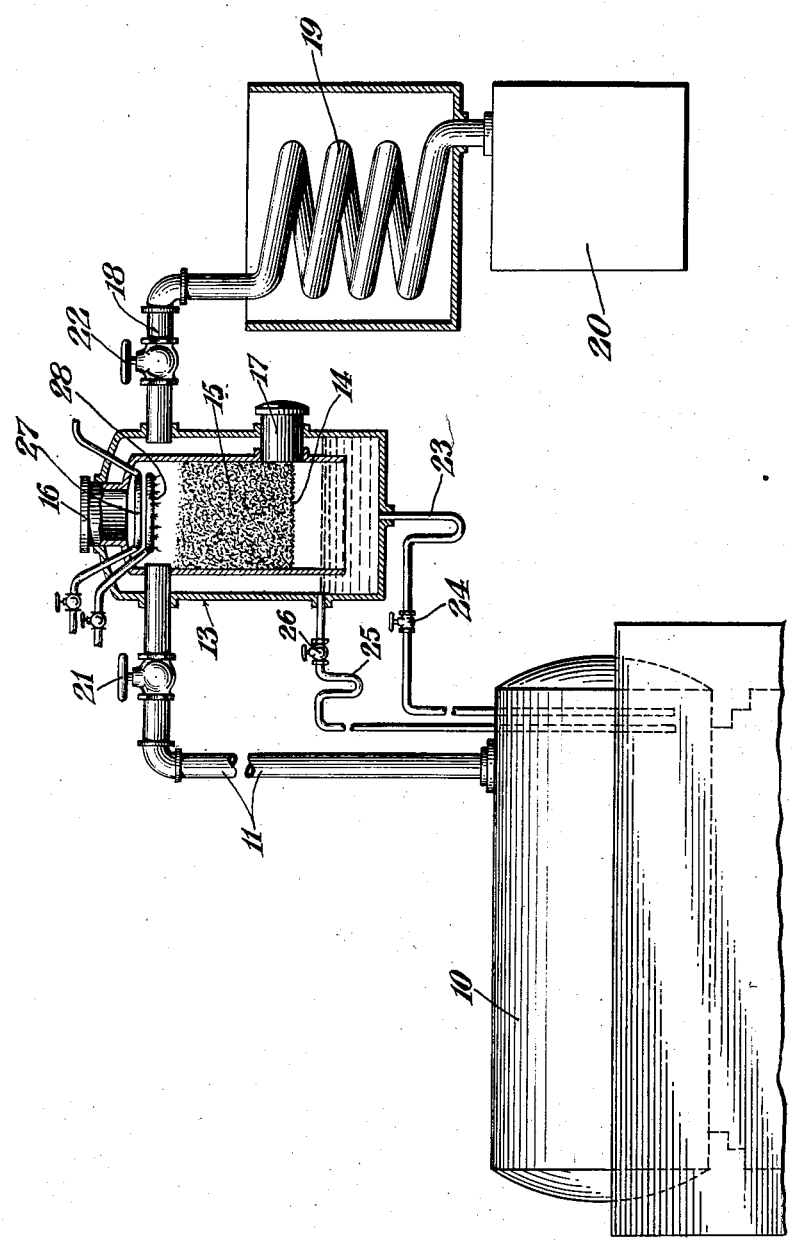
INVENTOR
Thomas T. Gray
BY
Kenyon & Kenyon
ATTORNEY

Patented Mar. 27, 1934

1,952,855

UNITED STATES PATENT OFFICE 1,952,855

METHOD OF PURIFYING HYDROCARBON COMPOUNDS

Thomas T. Gray, Elizabeth, N. J., assignor to The Gray Processes Corporation, Newark, N. J., a corporation of Delaware Original application March 24, 1925, Serial No. 17,855. Divided and this application May 19, 1930, Serial No. 453,638

10 Claims. (Cl. 196—96)

This invention relates to the treatment of hydrocarbons and the distillates thereof by polymerization of unstable, unsaturated compounds present in such hydrocarbons. It involves improvements in means for carrying on the process described in my Patent, No. 1,340,889 granted May 25, 1920 and in my pending applications, Serial No. 664,893 filed September 26, 1923 and 17,855, filed March 24, 1925 of which this application is a division; and particularly, it involves means for improving the operation of those processes and for facilitating the removal of the spent catalyst from apparatus used therein.

It will be understood that in carrying on the said process, the hydrocarbons to be purified are first vaporized and then passed in vapor form into and through a chamber containing solid adsorptive treating material such as fuller's earth, capable of selectively polymerizing the unstable, unsaturated compounds. In treating hydrocarbons, such as cracked distillate or so-called cracked gasoline, kerosene, etc., to remove unstable, unsaturated compounds, such as diolefins and the like, it is found that with the passing of vapor through the adsorptive material a deposit of gum or other adhesive material forms thereon which tends to coat and adhere to the surface of the adsorptive material and so interfere with its action and gradually impair the effectiveness of the process until finally the adsorptive material is rendered so far ineffectual that it becomes spent, so that it must be burned or otherwise revitalized in order that it may be restored to condition for use. Difficulties have been experienced in removing spent adsorptive material from the chamber due to the fact that the foreign materials deposited therein during the treatment of the hydrocarbon vapors are gummy and adhesive so that the adsorptive material tends to stick together in masses and to form lumps which prevent easy removal of the treating material. It is of great importance in the practical use of the process in connection with other refinery apparatus that the activity of the treating material be prolonged to the maximum and the time required for emptying and recharging the treating tower should be cut down to the minimum in order to reduce delay and interfere as little as possible with the operation of the other apparatus.

I have discovered that by introducing a solvent in small quantities into the treating tower for the purpose of washing out the treating material referred to, I am able to improve and prolong the effectiveness of the adsorptive material and to overcome the tendency thereof to form into lumps and clog. By this means, I am able to keep the adsorptive material in such condition that it may quickly and easily be removed from the treating tower.

Objects of my invention are to provide for carrying on the processes described in the aforementioned patent and applications more economically and effectually and to provide for rapidly discharging the adsorptive material from the treating tower when such material has become spent, so that the apparatus may operate longer on a single charge and may be out of operation on account of discharging and recharging for the least possible time.

Other objects, novel features and advantages of this invention will be apparent from the following specification and accompanying drawing wherein is illustrated one form of apparatus for carrying on the invention.

A still 10 of ordinary construction and set in brickwork is heated by fire or otherwise in the usual manner. The still may be provided with suitable connections (not shown) for supplying fresh oil and withdrawing residual oil in order that distillation may be carried on continuously. It is connected by a vapor line 11 with the inner chamber of a double-walled tower 13, the inner wall of which terminates above the bottom of the tower. A screen 14 is provided within this inner chamber and supports a charge of treating material 15. A charging manhole 16 is provided at the top of the tower and a discharging manhole 17 is provided adjacent the screen 14. A vapor discharge pipe 18 leads from the upper portion of the annular chamber of the tower 13 to the condenser 19 which in turn communicates with the run down tank 20. The pipes 11 and 18 are provided with valves 21 and 22 respectively.

A trapped pipe 23 controlled by a valve 24 leads from the bottom of the treating tower into the still tank. A trapped pipe 25 controlled by the valve 26 communicates with the tower at a point slightly above the lower edge of the inner wall and leads to the still 10. The pipe 23 provides means for draining the treating tower and the valve 24 is normally kept closed. The pipe 25 provides means for maintaining a constant level of liquid in the bottom of the tower and the valve 26 normally is open. The level of the liquid in the bottom of the tower is such that the lower edge of the inner wall of the tower projects below the surface of the liquid, thus forcing vapor to pass through the liquid in order to get into the annular chamber and out through the discharge pipe 18.

In the top of the inner chamber there is provided a ring 27 through which cooling fluid may be circulated. There is also provided a spray 28 by means of which liquids may be introduced into the inner chamber.

In the operation of the apparatus above described vapors from the still 10 are conducted through the pipe 11 into the inner chamber of the double walled tower and are caused to pass downwardly through the adsorptive material 15, under the lower edge of the inner chamber wall, upwardly through the annular chamber and out through the discharge pipe 18 to the condenser and run down tank 20. These vapors contain unsaturated, unstable hydrocarbon compounds which are polymerized by the adsorptive material to form polymers of higher boiling point which liquefy in the adsorptive material and drain through the screen 14 into the bottom of the treating tower. The process likewise results in the deposit of gum and other foreign and adhesive matter in the adsorptive material so that ultimately the polymerizing action is substantially interfered with.

To prolong the life of the treating material, I pass a quantity of solvent through the adsorptive material for the purpose of dissolving and removing with it foreign matter as well as expediting the drainage of the polymers, thus keeping clean the surface of the adsorptive material so that it is free to exercise its adsorptive effect on the passing vapors. Any suitable solvent may be employed, but I have found that condensate from the vapors is generally satisfactory for the purpose. This condensate may be obtained by so regulating the temperature and pressure of the process that a portion of the vapors in the inner chamber will condense within the inner chamber and flow through the adsorptive material. The pressure and hence the temperature of the vapors passing through the tower may be regulated by means of the valves 21 and 22.

Such solvent also may be supplied from a source (not shown) to the spray head 28, or condensate may be obtained within the chamber by passing cooling fluid through the ring 27. Irrespective of the manner in which the solvent is introduced into the chamber it dissolves foreign matter and conveys the same in liquid form together with polymers through the screen 14.

In the bottom of the tower is contained a body of liquid which has drained from the treating material and which seals the lower end of the inner chamber. This body of liquid is kept at a predetermined level by means of the overflow pipe 25. The treated vapors pass through this body of liquid and are washed and scrubbed by their passage through the same, after which they are conducted by the pipe 18 to the condenser 19. The passage of the vapors through the body of liquid in the bottom of the tower removes from the vapor any entrained liquid such as polymers or condensate, thereby insuring a liquid product of stable color and further prolonging the effective life of the treating agent.

The process may be practiced with apparatus other than that above described and changes may be made in the structure of the apparatus without departing from the spirit of the invention. For example, a single sh'l tower such as is also shown in my application, Serial No. 17,855 may be utilized by suitably arranging the piping so that the treated vapors are caused to pass through a pool of liquid in the bottom of the tower.

I claim:

1. The process of treating hydrocarbon oils to effect separation therefrom of undesirable unsaturated compounds of substantially the same boiling point which comprises polymerizing said unsaturated compounds to form compounds of higher boiling point by continuously passing the oil in the vapor form through a solid adsorbent catalytic material at such temperatures that a portion of the vapors are condensed to liquid and are passed downward through the catalytic material, dissolving therefrom adsorbed polymers and continuously maintaining the activity of the catalyst, and subsequently passing treated vapor through a body of liquid obtained from the treating material.

2. The process of purifying cracked hydrocarbons which consists in passing the same in vapor form through a body of solid adsorbent material thereby depositing on the said material a polymerized compound which tends by its presence to render the said material ineffectual and removing the said compound during operation of the process by passage of a condensate of the said vapors through the said material, collecting liquid draining from treating material and passing treated vapor through such liquid.

3. The process of purifying cracked hydrocarbons which consists in passing vapors thereof into contact with a solid adsorbent material to induce polymerization of unsaturated constituents thereof and coincidently passing a liquid solvent of the polymers through such material, and subsequently passing treated vapor through a body of liquid drained from the treating material.

4. The process of purifying cracked hydrocarbons which consists in passing the same in vapor form through a body of solid adsorbent material, thereby depositing on the said material a polymerized compound which tends by its presence to render the said material ineffectual, condensing a portion of the vapors in the presence of the said deposited compound to form a liquid capable of dissolving the same and passing the said liquid through the said material thereby continuously washing out the said deposited compound and revitalizing the said material, collecting liquid draining from treating material and passing treated vapor through such liquid.

5. The process of purifying cracked hydrocarbons which consists in passing the same partly in liquid and partly in vapor form into contact with a solid adsorbent material to form polymers from unsaturated constituents of such hydrocarbons and continuously dissolving the polymers in and removing them from the said material with the liquid portion of the said hydrocarbons, and subsequently passing treated vapor through a body of liquid drained from the treating material.

6. The process of purifying cracked hydrocarbons which consists in passing the same in vapor form through a body of solid adsorbent material thereby forming in the said hydrocarbons certain high boiling polymerized compounds, maintaining the said material at a temperature such as to produce condensation of a portion of the entering vapors, passing the condensate through the said material to thereby substantially remove the said compounds and separating the vapors and liquids emerging from the said material, collecting liquid draining from treating material and passing treated vapor through such liquid.

7. The process of purifying cracked hydrocarbons which consists in passing the same in vapor form through a body of solid adsorbent material thereby depositing on the said material a polymerized compound which tends by its presence to render the said material ineffectual and then removing the said compound by passing a liquid solvent thereof through the said material, and subsequently passing treated vapor through a body of liquid drained from the treating material.

8. The process of purifying cracked hydrocarbons which consists in passing the same in vapor form into contact with a body of solid adsorbent material thereby depositing a polymerized compound on the said material, regulating the pressure of the said vapors in the presence of the said material in such manner as to produce condensation of a portion thereof and passing the condensate through the said material to substantially remove the said compound and revitalize the said material without interruption of the process, collecting liquid draining from treating material and passing treated vapor through such liquid.

9. The process of purifying cracked hydrocarbons which consists in passing the same in vapor phase into contact with solid adsorptive material to induce polymerization of unsaturated constituents thereof and subsequently passing the treated vapors through a body of liquid hydrocarbon to remove entrained polymers.

10. The process of purifying cracked hydrocarbons which consists in passing the same in vapor phase through a body of solid adsorptive material to induce polymerization of unsaturated constituents thereof, collecting liquid draining from the adsorbent material and passing the treated vapor through such liquid.

THOMAS T. GRAY.